Aug. 15, 1961
C. B. NELSON
2,996,019
RAILWAY VEHICLE TRUCK
Filed May 14, 1956
2 Sheets-Sheet 1
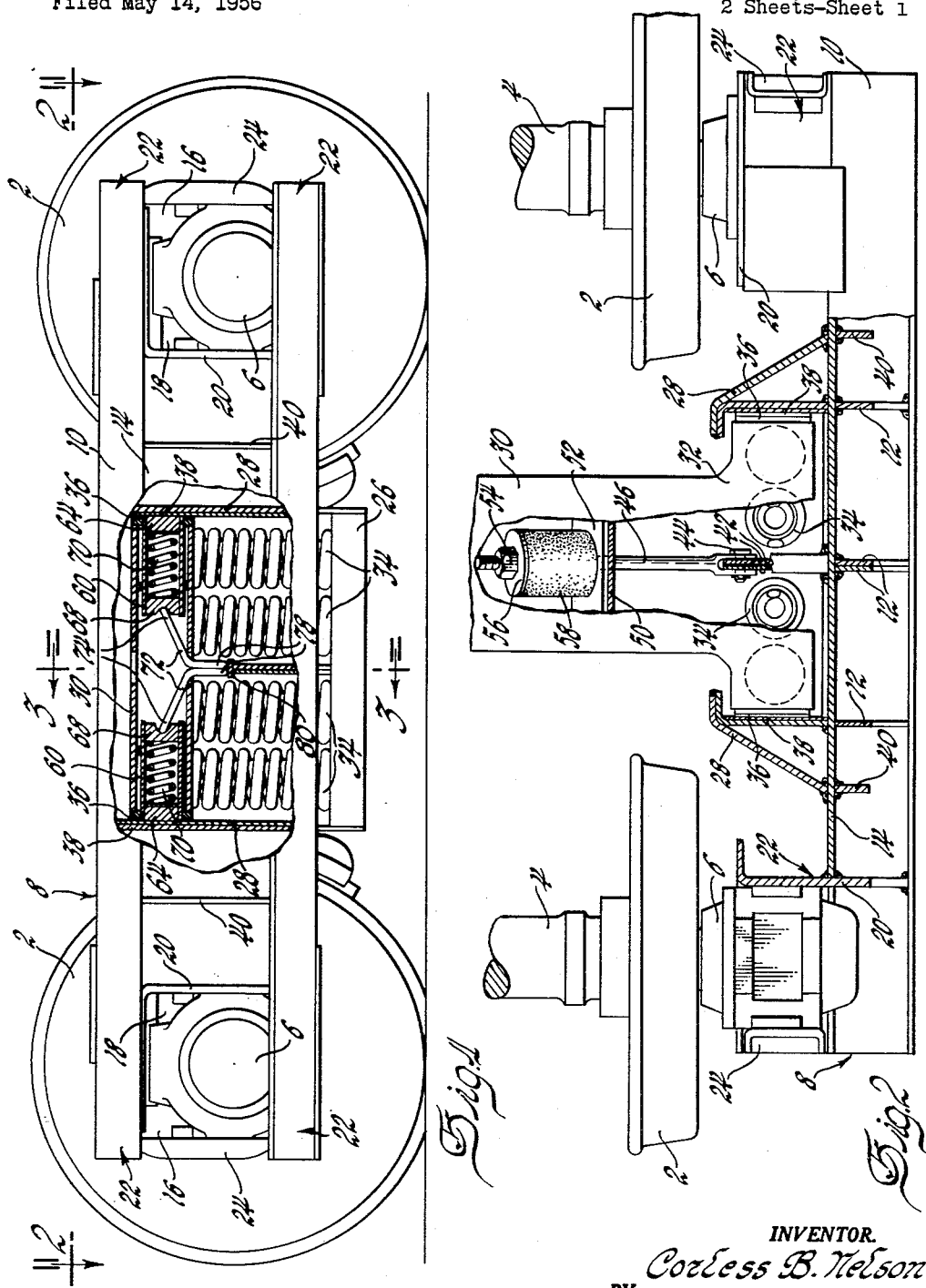
INVENTOR.
Corless B. Nelson
BY
S. C. Thorpe
ATTORNEY Aug. 15, 1961   C. B. NELSON   2,996,019
RAILWAY VEHICLE TRUCK
Filed May 14, 1956   2 Sheets-Sheet 2
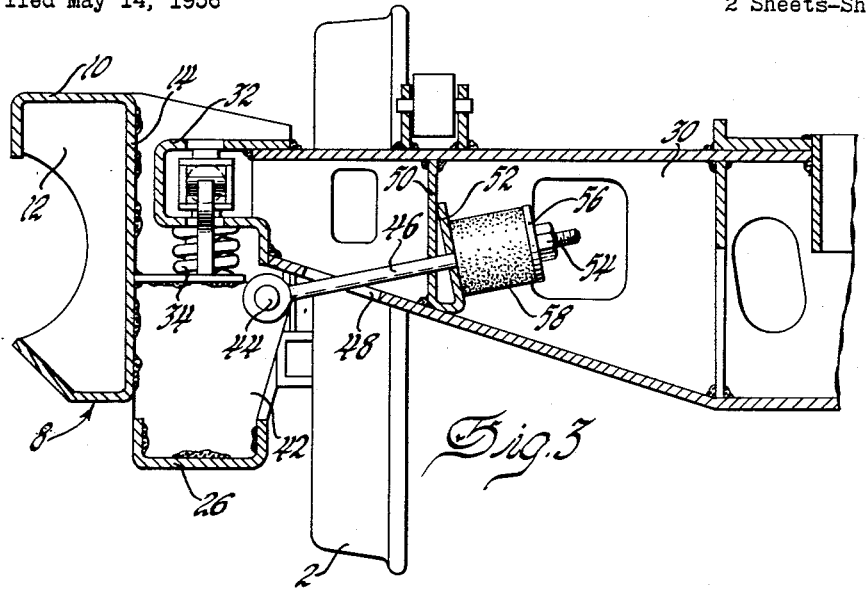

United States Patent Office 2,996,019
Patented Aug. 15, 1961

2,996,019
RAILWAY VEHICLE TRUCK
Corless B. Nelson, Chicago, Ill., assignor to General Motors Corporation, Detroit, Mich., a corporation of Delaware
Filed May 14, 1956, Ser. No. 584,817
3 Claims. (Cl. 105—193)

This invention relates generally to railway vehicle trucks and more particularly to specially fabricated trucks which, because of new welding techniques and unique fabrication methods, may be made for considerably less money than equivalent cast trucks and without sacrificing any strength, safety or riding qualities.

This invention also relates to the lateral-swinging-bolster-type of truck in which the bolster is supported directly on the frame through the medium of springs so that the bolster can move both laterally and vertically with respect to the frame. The invention further relates to means for controlling such movement.

One of the important factors that heretofore has limited the use of fabricated trucks is that such trucks have been subject to severe torsional stresses and strains and high local stress concentrations at connecting seams and joints which even with the new welding and fabricating techniques mentioned have caused such joints and seams to fail. The present invention, however, has overcome such difficulties in large measure by providing a uniquely fabricated assembly which essentially comprises a longitudinally extending side frame formed from simple, readily stocked shapes. This side frame his laterally, inwardly extending, fabricated projections which are supported by the usual journal box assemblies and also has a centrally located and inwardly extending fabricated projection on which a bolster end is supported so that all upward and downward supporting and supported forces and loads of the side frame lie in the same general, vertical, longitudinally extending plane through the journal box assemblies and the point on which the bolster is supported on the frame. By fabricating the side frame in this manner all torsion stresses which cause most frequent failure are eliminated.

It has long been recognized that in a truck which utilizes a bolster directly supported on the side frames through the medium of springs so that the bolster can move both vertically and laterally with respect to the side frames in order to obtain the proper ride it is necessary to provide increasing damping action of such movement with increasing loads. Numerous devices have been proposed for accomplishing this objective but so far as is known none is as simple and effective as that of the present invention in which have been utilized simple but uniquely formed levers acting directly between the frame and the snubbing devices located in the bolster to vary the biasing effect of the snubbing means as the bolster moves vertically with respect to the frame.

The problem of properly controlling, i.e., limiting, the movement of the bolster with respect to the truck frame is also one that has received considerable attention in recent years. Numerous devices have been employed which primarily comprise locating and relating various types of rigid stops between bolster and frame. Such devices, however, have proven unsatisfactory for one or more reasons but primarily because they are either too complicated or still allow uncontrolled movement with sudden impact, etc. The present invention has overcome such defects by the simple but unique expedient of a spring-biased link extending directly between bolster and frame diagonally positioned so that it controls both the vertical and the lateral movement of the bolster with respect to the frame. It is emphasized that the latter feature works in conjunction with the damping means mentioned to provide a controlled bolster movement which results in a truly superior riding truck. Furthermore, these limiting means serve the additional function of exactly, statically locating the ends of the bolster with respect to the truck frame and work in conjunction with the bolster-supporting springs in this latter respect.

For a fuller understanding of the features of this invention and the objects thereof, reference may be had to the accompanying detailed description and drawings, in which:

FIGURE 1 is a side view in elevation of the truck with portions broken away and in section, particularly illustrating the unique side frame fabrication as well as the novel means for damping vertical and lateral movement of the bolster with respect to the truck frame.

FIGURE 2 is a view in plan also with portions broken away and in section taken substantially on the line 2—2 of FIGURE 1 further illustrating the novel fabrication of the truck and also the manner in which the bolster is supported on the side frame and how the bolster is connected to the side frames to control the movement and location of the bolster with respect to the side frames.

FIGURE 3 is an end view in elevation and in section taken substantially on the line 3—3 of FIGURE 1 and further illustrates the unique fabrication of the frame as well as the novel manner of securing the bolster to the side frame members so as to control the vertical and lateral movement of the bolster as well as locate it with respect thereto.

FIGURE 4 is an enlarged view of a part of the broken-away portion of FIGURE 1 further illustrating the unique means for damping the lateral and vertical movement of the bolster with respect to the truck frame in accordance with the vertical deflection of the bolster relative to the frame.

Referring first to FIGURES 1 and 2, the railway vehicle truck in this instance includes longitudinally spaced pairs of wheels 2 pressed in the usual manner on axles 4. The ends of axles 4 are journaled for rotation in journal box assemblies 6. Supported by the journal box assemblies 6 and the wheel-and-axle sets are transversely spaced, longitudinally extending side frame member assemblies only one of which has been shown and indicated generally by a numeral 8. The assembly 8 comprises a channel-like rail 10 having a plurality of longitudinally spaced reinforcing webs 12 welded or otherwise fixed within the confines of the shape of the rail 10 (see FIGURE 3). From FIGURE 3 it will be observed that the member 10 includes a vertically positioned web 14 which, as seen in FIGURE 1, has been cut out at points 16 so as to provide end-facing openings 18. The openings 18 are reinforced by means of flanged angular plating members 20 which extend inboard of the rails 10 so as to provide horizontal, inwardly extending pedestal assemblies 22. Received in these horizontal pedestal assemblies 22 inboard of the rails 10 are the journal box assemblies 6. To prevent their dislocation therefrom after assembly of the truck, locking bars or braces 24 are provided at either end of the side frame assembly 8 and held in place by a suitable fastening means. It will be observed from the foregoing description that the journal box assemblies 6 are located inboard of the rails or side frame members 10, which it is believed represents a substantial departure from the usual practice.

Secured to the side rail 10 between the pedestal assemblies 22 is a supporting platform 26. This platform is secured to the lower edges of a pair of inwardly extending brackets 28 also secured to the side rail 10 inboard thereof. These brackets confine an end 32 of the railway vehicle bolster 30. The end 32 of bolster 30 is resiliently supported by sets of helical coil springs 34 between the end 32 of bolster 30 and the supporting platform 26. Without more, it will be observed—particularly from FIGURES 2 and 3—that the bolster 30 can move both vertically and laterally with respect to the truck frame. To transmit longitudinal movement between the bolster and the frame the ends of the bolster are provided with longitudinally end-facing chafing plates 36 which engage longitudinal center-facing chafing plates 38 fixed to the bracket assemblies 28.

It should be emphasized at this point that the springs 34 and the end 32 of the bolster, which is supported by the springs 34 on the platform 26, lie substantially in a vertical plane inboard of the side rail 10 and that the journal box assemblies 6 and the pedestal assemblies 22 supported on these journal box assemblies also lie substantially in this same vertical plane. Such arrangement is considered important in preventing torsional strains and stresses in the welds or other fastening means used to fabricate the various parts of the longitudinal side frame assembly. In other words, while it appears from FIGURE 2 that torsional strains might be exerted, a careful analysis of the location of the journal box assemblies and the springs 34 on platform 26 will bring out that, in fact, no such torsion exists in this side frame assembly. Furthermore, by fabricating the side frame member in the manner just described and locating it with respect to the bolster end and the journal box assemblies the easily formed rail 10 can be made small enough to meet international clearance lines.

It will be appreciated then that the unique arrangement just described represents a very unique fabricated side frame assembly which reduces the number of welded seams and joints to the very minimum. This will be more readily understood from a study of prior fabricated constructions where it will be noted that numerous complicated welds and shapes, etc., have always heretofore been used to fabricate a truck. For example, note the extreme simplicity of the shape of the side rail 10. It is no more than a longitudinally extending plate formed with a simple C-like cross section. The pedestal assemblies are simple U-shaped plates secured within suitably cut apertures in the rails 10. The brackets 28 and the supporting platform 26 are also of the utmost simplicity. The manner of reinforcing by use of the simple webs 12 and stiffeners 40 further emphasizes the ease of fabrication of the side frame assembly.

From the foregoing it will be appreciated that there are three important factors that govern the fabrication of a railway vehicle truck: cost, simplicity and a fabrication which is subject to the least amount of stress and strain at the points of fabrication. It is believed that the proposed construction meets all of these requirements in a manner heretofore not achieved.

Turning now to the manner of controlling the aforementioned movement of the bolster 30 with respect to the frame of the truck, it will be observed in FIGURES 2 and 3 that welded at the longitudinal center of the rail 10 inboard thereof and also to the U-shaped platform 26 (see FIGURE 3) is a vertical transverse set of plates 42. These plates, as mentioned, extend inboard of the side frames and have pivotally secured thereto by means of a pin 44 a rod 46. The rod 46 extends through a suitable aperture 48 provided in the fabricated bolster 30 through a reinforcing plate 50 bent back on itself so as to form a spring seat 52. The opposite end of rod 46 is threaded and carries a nut 54 against which abuts a washer 56 forming a second spring seat. Interposed between seat 52 and washer 56 is a spring 58 which tends to bias washer 56 away from spring seat 52 and rod 46 diagonally upwardly and laterally toward the center of the truck. Since an assembly of this type is located on either side of the truck, it will be readily appreciated that resilient resistance is offered to any lateral displacement of the bolster relative to the side frames. This resistance serves to maintain tram between the opposite side frames by resiliently holding the journal box assemblies laterally against the horizontal pedestal assemblies 22.

Although the springs 58 in the present instance have been shown as rubber springs, it should be readily appreciated that helical coil springs or springs of other types of resilient materials might be used in other applications and still be equally effective. The degree of stiffness of springs 58 and the amount of angularity of the rods 46 with respect to the bolster and the frame can be adjusted to determine the degree of stiffness necessary in controlling the vertical and lateral movement of the bolster with respect to the truck frame. In addition to controlling this movement by offering resistance, these devices additionally act to limit both vertical and lateral movement. They further serve as anti-separation means in the event it is desired to lift the truck by the bolster. In other words, the unique assemblies just described serve a four-fold purpose. First, they maintain tram between side frames; second, they control the aforementioned lateral and vertical movement of the truck with respect to the frame; they act as limit stops for such movement; and, finally, they serve as means to prevent separation of the bolster from the truck frame.

A third feature of the invention is best illustrated by FIGURES 1, 3 and 4 and represents a further means for controlling or damping the movement of the bolster with respect to the truck frame. One of the difficulties attending the type of truck wherein the bolster is resiliently supported directly on the truck frame for both vertical and lateral movement is that the resilient means usually used to support the truck may be subject to harmonic frequency oscillations which, unless damped, will cause "galloping" of the truck, an effect which often destroys the superior ride characteristics obtained with this type of bolster suspension. Unfortunately, this tendency appears to increase with increases in load so that even though suitable damping means may be provided for preventing "galloping" at a particular load, should the load change then the damping means may no longer be suitable for preventing this "galloping" effect. This third feature of the invention proposes to increase the damping effect in accordance with vertical deflection of the bolster relative to the frame which usually is reflective of the load on the bolster of the truck.

Referring particularly to FIGURES 1, 3 and 4, it will be observed that the end 32 of bolster 30 has provided therein pairs of oppositely disposed longitudinally extending sleeved housings 60. These housings extend through openings 62 provided in the chafing plates 36. Located in each housing 60 is a plunger 64 having a chafing surface 66 thereon. Also, guided in each housing 60 is a spring seat 68. Interposed between seat 68 and plunger 64 is a spring 70, which due to its reaction against seat 68 causes chafing surface 66 to frictionally engage the corresponding chafing surface on one of the chafing plates 38. The position of seat 68 in sleeved housing 60, however, is determined by the position of a lever 72 which has an end 74 received in a recess 76 in seat 68 and an opposite end 78 supported on a small horizontal plate 80 fixed to the aforementioned vertical transverse plates 42. Each lever 72 is retained in place on plate 80 by a corresponding oppositely acting lever 72 which also determines the location of its associated spring seat in its associated sleeved housing 60.

The operation of the damping means then is as follows: As the bolster 30 moves downwardly under increasing loads thereby further compressing the bolster-supporting springs 34, the ends 78 will be moved upwardly by plate 80 relative to the bolster 30. Since levers 72 are made of rigid material they are displaced from the position shown in solid lines in FIGURE 4 to perhaps a position such as is shown by the phantom lines in FIGURE 4 in which case spring seats 68 are moved to further compress the springs 70, which in turn cause greater frictional forces between the chafing surfaces 66 on the bolster and the chafing surfaces of the chafing plates 38 on the frame. In other words, movement downwardly of the bolster further loads the springs 70 whereas upward movement of the bolster relative to the frame tends to relieve the load on springs 70.

From the foregoing it will be appreciated that damping of the vertical and lateral movement of the bolster is varied in accordance with the vertical deflection of the bolster, i.e., the load on the bolster. It will be apparent that any degree of variance can be had merely by changing either the size or the shape of the lever 72. In other words, if it were desired to have only relatively light damping because the trucks were to be used for carrying light loads then much shorter effective lengths of levers 72 could be used. On the other hand, if it were found that it is necessary to have very rapid increases in the dumping effect in accordance with the slight changes in the load, the shape of the levers 72 could be varied to give this effect. The fact that the levers act to retain each other oppositely on each end of the bolster also leads to the simplicity of the device.

It will further be noted that it is an extremely simple matter to change out these levers and substitute new ones to obtain he damping characteristics desired. Since the levers are easily formed, this further simplifies the device.

One further feature of the invention which should be mentioned is the manner in which the latter two features cooperate or work together to control the movement of the bolster with respect to the frame. As the bolster 30 moves down under increased load it will be observed that some of the preload is removed from springs 58. This results in slightly greater freedom of movement and less bolster center-restoring forces from springs 58 which tends to maintain the total restoring forces (exerted by the now heavily loaded bolster-supporting springs 34 and springs 58) more or less constant, so as to increase the damping effect at a greater rate as load increases than are the bolster-restoring forces increased. It is believed that this also contributes to a truly superior riding truck which is obtainable only with the combined bolster damping, supporting and controlling means described above.

Although only one side of the truck has been described, it will be appreciated that both sides are the same and act in a similar manner.

I claim:

1. A railway vehicle truck comprising a pair of longitudinal spaced wheel and axle sets, journal boxes rotatably supported on the ends of said axles having upwardly facing supporting surfaces, a pair of fabricated longitudinally extending transversely spaced individual side frame members located outboard of said journal box assemblies each of said side frame members including an integrally formed channel of relatively deep section having a vertically located web, pedestal sets fixed to the web of said channels inboard thereof and embracing said journal box assemblies so that said side frames are supported on said surfaces outboard thereof, the webs of each of said channels having fixed thereto intermediate said journal box assemblies a support substantially in a vertical plane through the journal box assemblies associated with a respective side frame, and a transversely extending bolster having its opposite ends supported on said supports so that the upward forces applied by the upward supporting surfaces of said journal box assemblies to said side frame members lie substantially in the same vertical planes as the downward load forces applied to the supports on said side frame members by the ends of said bolster and tie means yieldable in a lateral direction connected between said bolster and each of said side frame members forming with said bolster and said wheel and axle sets the only connections between said side frame members.

2. In a railway vehicle truck a pair of longitudinally spaced wheeled axles each having a journal box on an end thereof both in a generally longitudinally extending vertical plane, a fabricated longitudinally extending side frame member outboard of said journal box assemblies, said side frame member including an integrally formed channel of relatively deep section having a vertically located web, pedestal assemblies fixed to the web of said channel inboard thereof and supported by said journal box assemblies, an inwardly extending support fixed to the web of said channel inboard thereof and in said longitudinally extending vertical plane, a transversely extending bolster having an end supported on said support in said plane so that the upward supporting force exerted on said side frame member by said journal box assemblies and the downward load forces exerted on said members by said bolster lie substantially in said plane and said side frame is stable about its longitudinally extending axis and tie means yieldable in lateral and vertical directions connected between said bolster and frame member forming the only connection stabilizing said frame member with respect to said bolster.

3. In a railway vehicle truck a pair of longitudinally spaced wheeled axles each having a journal box on an end thereof, both journal boxes being in a generally longitudinally extending plane, a fabricated longitudinally extending side frame member outboard of said journal box assemblies, said side frame member including an integrally formed channel of relatively deep section having a vertically located web, a transversely extending bolster, said side frame being supported on said journal box assemblies and said bolster being supported on an extension secured to said side frame member inboard thereof so that the upward supporting forces exerted on said side frame member by said journal box assemblies and the downward load forces exerted on said side frame member by said bolster lie substantially in a longitudinally extending vertical plane inboard of said side frame member and tie means yieldable in lateral and vertical directions connected between said bolster and frame member forming the only connection stabilizing said frame member with respect to said bolster.

References Cited in the file of this patent

UNITED STATES PATENTS

| | | |
|---|---|---|
| 408,119 | Hughes | July 30, 1889 |
| 748,007 | Powers | Dec. 29, 1903 |
| 1,065,526 | Hirsch | June 24, 1913 |
| 1,704,394 | Link | Mar. 5, 1929 |
| 1,879,549 | Sherman | Sept. 27, 1932 |
| 2,295,936 | Cottrell | Sept. 15, 1942 |
| 2,321,845 | Nystrom et al. | June 15, 1943 |
| 2,357,020 | Nystrom | Aug. 29, 1944 |
| 2,443,980 | Fish | June 22, 1948 |
| 2,630,079 | Cottrell | Mar. 3, 1953 |
| 2,682,232 | Wulff | June 29, 1954 |
| 2,712,288 | Dath | July 5, 1955 |
| 2,713,832 | Dean et al. | July 26, 1955 |
| 2,730,048 | Coskun | Jan. 10, 1956 |
| 2,743,682 | Cottrell | May 1, 1956 |
| 2,753,814 | Dilworth | July 10, 1956 |
| 2,756,691 | Masel et al. | July 31, 1956 |